United States Patent
Adamic

[11] Patent Number: 5,700,317
[45] Date of Patent: Dec. 23, 1997

[54] BLEED CONTROL IN INK-JET INKS VIA AQUEOUS PHASE SEPARATION

[75] Inventor: Raymond J. Adamic, Corvallis, Oreg.

[73] Assignee: Hewlett-Packard Company, Palo Alto, Calif.

[21] Appl. No.: 641,995

[22] Filed: Apr. 25, 1996

[51] Int. Cl.$^6$ ..................................................... C09D 11/02
[52] U.S. Cl. ..................... 106/31.58; 106/31.68; 106/31.36; 106/31.27; 106/31.43; 106/31.75; 106/31.86; 106/31.6
[58] Field of Search ................ 106/31.58, 31.36, 106/31.27, 31.43, 31.68, 31.75, 31.86, 31.6

[56] References Cited

U.S. PATENT DOCUMENTS

| | | | |
|---|---|---|---|
| 4,531,976 | 7/1985 | Lin | 106/27 R |
| 4,836,851 | 6/1989 | Pawlowski et al. | 106/22 R |
| 5,091,005 | 2/1992 | Mueller et al. | 106/31.43 |
| 5,106,416 | 4/1992 | Moffatt et al. | 106/31.59 |
| 5,108,504 | 4/1992 | Johnson et al. | 106/25 R |
| 5,116,409 | 5/1992 | Moffatt | 106/22 R |
| 5,133,803 | 7/1992 | Moffatt | 106/25 R |
| 5,198,023 | 3/1993 | Stoffel | 106/22 R |
| 5,320,668 | 6/1994 | Shields et al. | 106/31.28 |
| 5,324,349 | 6/1994 | Sano et al. | 106/25 R |
| 5,342,439 | 8/1994 | Lauw | 106/31.59 |
| 5,462,592 | 10/1995 | Murakami et al. | 106/31.59 |
| 5,476,540 | 12/1995 | Shields et al. | 106/31.27 |
| 5,488,402 | 1/1996 | Shields et al. | 106/31.27 |
| 5,518,534 | 5/1996 | Pearlstine et al. | 106/31.6 |
| 5,531,817 | 7/1996 | Shileds et al. | 106/31.27 |
| 5,536,306 | 7/1996 | Johnson et al. | 106/31.59 |
| 5,565,022 | 10/1996 | Wickramanayake | 106/31.59 |
| 5,626,655 | 5/1997 | Pawlowski et al. | 106/31.59 |

FOREIGN PATENT DOCUMENTS

| | | | |
|---|---|---|---|
| 0483610A2 | 5/1992 | European Pat. Off. | C09D 11/02 |
| 0581135A1 | 2/1994 | European Pat. Off. | C09D 11/00 |
| 0663299A2 | 7/1995 | European Pat. Off. | B41M 5/00 |

OTHER PUBLICATIONS

Per–Ake Albertsson, "Partition of Cell Particles and Macromolecules", 1986, John Wiley & Sons, 3rd Edition, pp. 1–71, no month available.

*Primary Examiner*—Helene Klemanski

[57] ABSTRACT

Aqueous phase separation is employed to reduce or substantially eliminate bleed between adjacently-printed ink-jet ink compositions. An ink-jet ink set is provided that comprises first and second ink-jet inks, both of which comprise a colorant and an aqueous vehicle. The vehicle of the first ink-jet ink includes a polymer, while the vehicle of the second ink-jet includes a second species capable of inducing aqueous phase separation between the first and second inks in the event of contact therebetween. The resulting aqueous phases are separated by an interfacial boundary that serves to inhibit bleed between the inks. Importantly, in spite of the polymer concentration contained therein, the inks in the ink-jet ink set have sufficiently low viscosities such that they are capable of being readily jetted from an ink-jet pen. The use of aqueous phase separation to achieve bleed control is advantageous because it offers more flexibility in ink formulation, does not introduce highly toxic or corrosive components to the ink-jet ink composition, does not sacrifice edge acuity, and is an easily implemented and cost-effective manner in which to achieve bleed control in ink-jet printing.

30 Claims, 6 Drawing Sheets

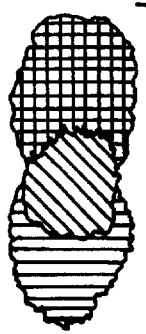
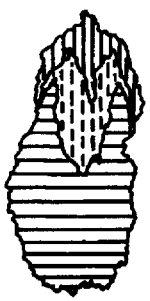
FIG. 4A  FIG. 4B  FIG. 5A  FIG. 5B
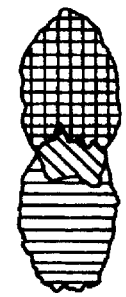
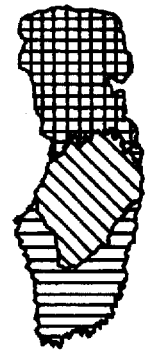
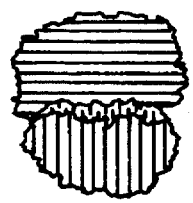
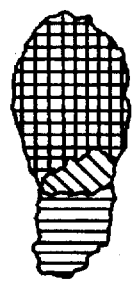
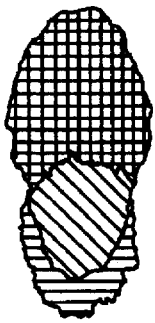
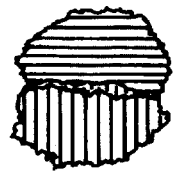

BLEED CONTROL IN INK-JET INKS VIA AQUEOUS PHASE SEPARATION

TECHNICAL FIELD

The present invention relates to ink-jet inks employed in ink-jet printing, and, more particularly, to the reduction of bleed between adjacently-printed ink-jet inks by inducing aqueous phase separation therebetween.

BACKGROUND ART

Ink-jet printing is a non-impact printing process in which droplets of ink are deposited on a print medium in a particular order to form alphanumeric characters, area fills, and other patterns thereon. Low cost and high quality of output, combined with relatively noise-free operation, have made ink-jet printers a popular alternative to other types of printers used with computers.

The non-impact printing process of ink-jet printing involves the ejection of fine droplets of ink onto a print media such as paper, transparency film, or textiles in response to electrical signals generated by a microprocessor. There are two basic means currently available for achieving ink droplet ejection in ink-jet printing: thermally and piezo-electrically. In thermal ink-jet printing, the energy for drop ejection is generated by electrically-heated resistor elements, which heat up rapidly in response to electrical signals from a microprocessor to create a vapor bubble, resulting in the expulsion of ink through nozzles associated with the resistor elements. In piezoelectric ink-jet printing, the ink droplets are ejected due to the vibrations of piezo-electric crystals, again, in response to electrical signals generated by the microprocessor.

In commercially-available thermal ink-jet color printers, such as one of Hewlett-Packard's DeskJet® printers, a color spectrum is achieved by combining cyan, magenta, and yellow inks in various proportions. A four-pen set including the three primary color inks and a black ink is typically employed in such printers to achieve the necessary color combinations. The cyan, magenta, and yellow inks derive their hues from cyan, magenta, and yellow colorants, respectively.

Colorants for inks are available in the form of dyes or pigments. Accordingly, ink-jet inks are available as either dye-based or pigment-based compositions. Of the two, dye-based ink-jet ink compositions are much more widely available. Dye-based ink-jet ink compositions are generally aqueous-based and are formulated by dissolving dye in an ink vehicle. The dye molecules employed in ink-jet ink compositions are often in the form of dye salts made of a dye anion and a cation such as sodium or tetramethylammonium. A limited number of pigment-based ink-jet inks are also available, which generally comprise a pigment dispersed in an aqueous solution by a dispersant. Pigments offer the very desirable properties of waterfastness and lightfastness.

Regardless of whether an ink is dye-based or pigment-based, ink-jet inks are commonly plagued by the occurrence of bleed. The term "bleed", as used herein, is defined to be the invasion of one color into another, as evidenced by a ragged border therebetween. Bleed occurs as colors mix both on the surface of the paper substrate as well as within the substrate itself. The occurrence of bleed is especially problematic between a black ink and an adjacently-printed color ink because it is all the more visible. Hence, to achieve good print quality, bleed must be substantially reduced or eliminated such that borders between colors are clean and free from the invasion of one color into the other.

Various solutions to the problem of black to color and color to color bleed have been proffered. Some solutions involve changing the ink environment to reduce bleed. For instance, heated platens and other heat sources, along with specially-formulated paper, have been employed to reduce bleed. However, heated platens add cost to the printer, and specially-formulated paper is more expensive than "plain" paper. Thus, using external paraphernalia to reduce bleed in thermal ink-jet printing is generally not cost-effective.

Other proposed solutions involve changing the composition of the ink-jet ink to reduce bleed. For example, surfactants have been used to increase the penetration rate of ink into the paper. U.S. Pat. No. 5,116,409, entitled "Bleed Alleviation in Ink-Jet Inks", discloses and claims employing zwitterionic surfactants or ionic or non-ionic amphiphiles at concentrations above their critical micelle concentration to achieve bleed control. However, the addition of surfactants to achieve bleed control has been known to cause a reduction in edge acuity.

It is also known to incorporate metal ion precipitating agents into ink-jet inks to reduce bleed. Specifically, a solution to the problem of black to yellow color bleed is disclosed in U.S. Pat. No. 5,198,023, entitled "Cationic Dyes with Added Multi-Valent Cations to Reduce Bleed in Thermal Ink-Jet Inks" and assigned to the same assignee as the present application, wherein multivalent cations such as in calcium chloride and magnesium chloride are added at concentrations ranging from about 1 to 10 wt % to yellow cationic inks to prevent bleed between yellow and black inks. Other anions aside from chloride anions include fluoride and nitrate anions. While such multivalent cations as calcium and magnesium are effective in controlling bleed, they are also unstable with a number of dye choices, thereby constraining the formulation of ink-jet ink compositions. Moreover, nitrates are toxic and should therefore be avoided in ink-jet ink compositions.

Another method of reducing bleed between ink-jet inks involves the use of pH-sensitive dyes as disclosed in application Ser. No. 08/567,974, filed Dec. 6, 1995, entitled "Bleed Alleviation in Ink-Jet Inks Using Organic Acids" and assigned to the same assignee as the present application. It is disclosed therein that one ink-jet ink includes a pH-sensitive colorant and a second ink-jet ink is buffered to an appropriate pH that will induce the precipitation of the pH-sensitive colorant upon contact therewith. An organic acid at a concentration ranging from about 0.5 to 20 wt % is employed in the second ink-jet ink to reduce the pH differential required to render insoluble the pH-sensitive colorant. While this means of reducing bleed between two inks is effective, the lower pH required to achieve a sufficient pH differential along with the presence of a free acid may pose material compatibility concerns. Moreover, choice of colorant is constrained by the requirement that the colorant be appropriately pH-sensitive or pH-insensitive, as appropriate for the particular ink.

Finally, yet another method of reducing bleed between ink-jet inks involves the use of microemulsion-based vehicles, such as disclosed in patent application Ser. No. 08/528,077 now U.S. Pat. No. 5,531,816 entitled "Bleed-Alleviated, Waterfast, Pigment-Based Ink-Jet Ink Compositions", which was filed on Sep. 14, 1995 and assigned to the same assignee as the present application. A pigment-based ink-jet ink composition is disclosed therein that employs an amphiphile to solubilize a water-insoluble organic compound in an aqueous solution, thereby achieving reduced bleed. While this means of reducing bleed is effective, it is too early to assess the viability of this approach.

Therefore, a need exists for a means to effectively control bleed between ink-jet inks that allows for greater flexibility in ink formulation, that is relatively non-toxic and non-corrosive to printer parts, and that does not sacrifice edge acuity. Moreover, the means of controlling bleed should be easily implemented and cost-effective.

DISCLOSURE OF INVENTION

In accordance with the invention, an ink-jet ink set and a method of reducing bleed in ink-jet printing are provided which employ aqueous phase separation to reduce or substantially eliminate bleed between adjacently-printed ink-jet ink compositions. More particularly, the ink-jet ink set includes a first and second ink-jet ink, both of which comprise a colorant and an aqueous vehicle. The vehicle of the first ink-jet ink includes a polymer, while the vehicle of the second ink-jet ink includes a second species capable of inducing aqueous phase separation in the event of contact between the first and second inks. Importantly, in spite of the polymer concentration contained therein, the inks in the ink-jet ink set have sufficiently low viscosities such that they are capable of being jetted from an ink-jet pen.

By employing the concept of aqueous phase separation to achieve bleed control, the present method overcomes the above-described disadvantages of other bleed control methods. More specifically, the present method does not substantially constrain the options for colorants, nor does it introduce highly toxic or corrosive components to the ink-jet ink composition. By avoiding the use of large amounts of surfactants, the edge acuity of the ink-jet inks is not sacrificed to achieve bleed control. Finally, the present approach to bleed control is easily implemented and cost-effective. The present ink-jet ink set and method may be used to control bleed on any type of print media employed in ink-jet printing, such as paper media, transparencies, and textiles.

BRIEF DESCRIPTION OF THE DRAWINGS

FIGS. 2–6 illustrate the bleed occurring between ink-jet inks when pipetted adjacent one another on tissue material, with FIGS. 2A–6A representing ink-jet inks formulated in accordance with the invention and FIGS. 2B–6B representing ink-jet inks having compositions outside the scope of the invention, e.g., without polymeric additive;

FIGS. 11A and 11B are line drawings illustrating the bleed occurring between a black ink and each of several dye-based color ink-jet inks printed onto Champion Datacopy paper, with the dye-based color ink-jet inks having been cross-hatched by the black ink-jet ink, wherein FIG. 11A represents ink-jet inks having compositions outside the scope of the invention and FIG. 11B represents ink-jet inks formulated in accordance with the invention.

BEST MODES FOR CARRYING OUT THE INVENTION

Figure 1:
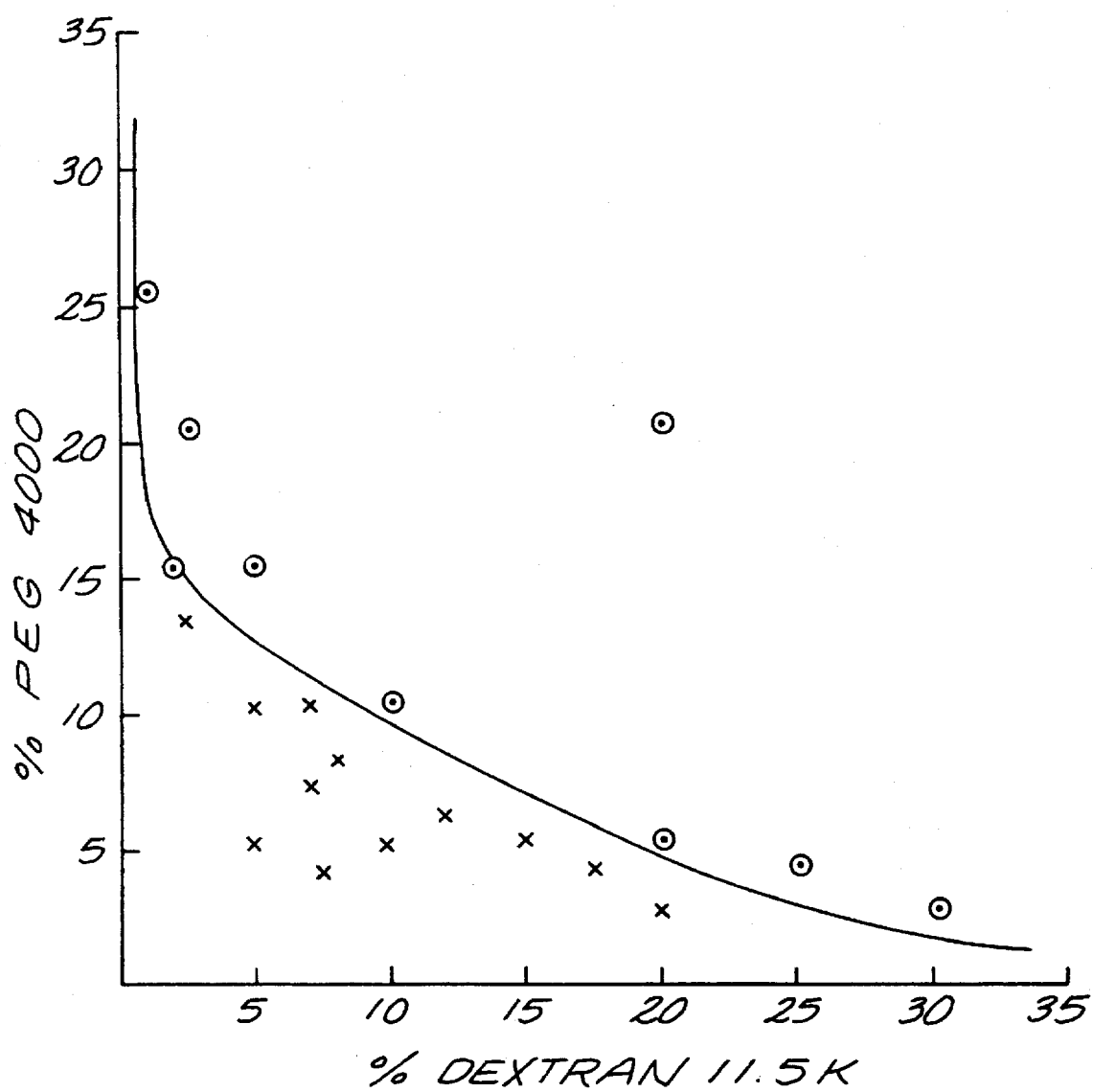
FIG. 1 is a phase diagram illustrating, for an ink vehicle containing 7.5 wt % 1,5 pentanediol and 5 wt % 2-pyrrolidone, the respective concentrations required of polyethylene glycol (molecular weight 4,000) and dextran (molecular weight 11,500) to achieve aqueous phase separation.

The invention described herein is directed to a method of controlling bleed between adjacently-printed ink-jet inks, as well as to an ink-jet ink set evidencing reduced bleed. In general, the method is directed to formulating ink vehicles such that aqueous phase separation occurs in the event the ink vehicles are adjacently printed. (For purposes herein, the term "vehicle" refers to all components in an ink except the colorant.) The occurrence of aqueous phase separation alleviates or eliminates bleed between inks by preventing the vehicles from interacting; essentially, the method minimizes mixing between aqueous ink-jet ink vehicles prepared in accordance with the invention. Aqueous phase separation is achieved by incorporating a polymer in one aqueous vehicle and incorporating a second species in the second aqueous vehicle that is either substantially immiscible with the polymer or capable of rendering the polymer insoluble.

The concept of selectively distributing substances between aqueous phases using polymer immiscibility is known and well-documented in the biotechnology field. (see, e.g., *Partition of Cell Particles and Macromolecules*, Albertsson, $3^{rd}$ ed., John Wiley & Sons.) In general, mixtures of solutions of dissimilar polymers in a given solvent induce phase separation. More than two phases may be induced by employing more than two dissimilar polymers: there will be as many phases as unlike polymers in the solvent. Thus, although it may seem paradoxical, one may obtain phase separation by incorporating polymers into a solvent that are at once dissimilar yet water soluble. Some of the substances successfully separated by aqueous phase partitioning in the biotechnology field include various proteins, cells, enzymes, nucleic acids, bacteria, and viruses. Aqueous phase separation is very useful for separating fragile biological material, which might otherwise break apart using other less gentle separation methods.

The usefulness of polymers in the formation of separate aqueous phases derives from the natural aversion polymers have to mixing or interacting with other polymers when placed in close contact with one another. Energy is typically required to break water-polymer solvent bonds before the polymer segment can interact with another water-solvated polymer segment. Thus, in accordance with the laws of entropy, polymers have a tendency to interact only in the relatively infrequent instance in which the two different polymer segments prefer to interact over the polymer's interaction with water. In an aqueous solution containing two polymers that are immiscible with one another, the solution separates into two immiscible phases, one being rich in one polymer and the second phase being rich in the alternate polymer. The two immiscible phases are separated by an interfacial boundary.

Examples of liquid polymer two-phase systems are provided in Table 2.1 of the Albertsson text cited above (Id. at page 9). It is contemplated that these same types of two-phase systems disclosed by Albertsson for phase separation in the field of biotechnology may be employed in the field of ink-jet printing to achieve phase separation and, accordingly, bleed control.

It is noted that polymers have long been used in ink-jet ink compositions to improve various properties thereof. For example, in U.S. Pat. No. 5,324,349 (Sano et al, assigned to Seiko Epson Corporation), a saccharide or polyol is added to a pigment-based ink-jet ink composition to improve optical density, dry time, and abrasion resistance, as well as to prevent obstruction of the nozzle. U.S. Pat. No. 4,836,851 (Pawlowski et al, assigned to the same assignee as the present application) discloses the attachment of polyhydroxyl groups to dye molecules to improve water solubility and interaction with paper. U.S. Pat. No. 5,108,504 (Johnson et al, assigned to the same assignee as the present application) discloses incorporating polysaccharide in an ink vehicle to achieve a number of advantages for a particular dye set, including bleed control, preferably in tandem with a co-surfactant. U.S. Pat. No. 4,531,976 (Lin, assigned to Exxon Research and Engineering Co.) discloses the use of two miscibly incompatible components in the same ink-jet ink composition using a solvent miscible to each to improve surface tension and thereby improve jettability and dot size. However, none of these issued patents employs aqueous phase separation to achieve bleed control. More specifically, none of these patents teach pairing inks in which one has a polymer and the other has a second species in order to induce aqueous phase separation between the two inks.

In the practice of the invention, bleed is controlled between two ink-jet inks by incorporating a polymer in one ink and a second species in the other ink that is immiscible with the polymer, such that separate aqueous phases would be formed given interaction between the two ink-jet inks. In general, when two aqueous systems containing some concentration of non-interacting polymers are mixed, a cloudiness initially appears and, after an elapsed period of time, the mixture separates into two distinct phases, one being enriched with one polymeric component and the second being enriched with the alternate polymeric component. In this fashion, if a first ink-jet ink containing a polymeric component is paired with a second ink-jet ink containing a second species that is immiscible with the polymer in the first ink, and these two inks are printed adjacently one another, an interfacial boundary will arise between the two inks as evidence of aqueous phase separation. Therefore, the tendency for the inks to mix or bleed upon being printed adjacently on a print medium is reduced.

The polymer employed in the practice of the invention may be any nonionic or ionic polymer-both water-soluble polymers and water-insoluble polymers may be employed to achieve aqueous phase separation in accordance with the present approach. Examples of suitably employed nonionic polymers include, but are not limited to, polyethylene glycols and derivatives thereof having a minimum average molecular weight of about 200; polypropylene glycols and derivatives thereof having a minimum average molecular weight of about 200; polysaccharides and derivatives thereof, polyvinylalcohols and derivatives thereof having an average molecular weight within the range of about 10,000 to 200,000; polyvinylpyrrolidones and derivatives thereof having an average molecular weight within the range of about 2,000 to 500,000; polysucrose and derivatives thereof having an average molecular weight within the range of about 40,000 to 400,000, such as Ficoll® (a polysucrose commercially available from Pharmacia Inc.); and ethoxy- and propoxylated glycerols and derivatives thereof having an average molecular weight within the range of about 500 to 10,000.

Specific examples of suitably-employed derivatives of polyethylene glycols include, but are not limited to, polyethylene glycol methyl ether and polyethylene glycol bis (carboxymethyl)ether. Examples of suitably-employed polysaccharides include, but are not limited to, methylcellulose, carboxymethylcellulose, and dextran, with the dextran and dextran derivatives having an average molecular weight within the range of about 3,000 to 2,000,000. Particular examples of derivatives of dextran suitably employed in the practice of the invention include diethylaminoethyl-dextran and hydroxypropyldextran. It is further noted that dextran may be regarded as representative of a group of polymers including, but not limited to, glycogen, levan and soluble starch. Particular examples of ethoxy- and propoxylated glycerols include, but are not limited to, LEG ("Liponics® ethoxylated glycerol"); glycerol propoxylates and derivatives thereof having an average molecular weight within the range of about 725 to 4,100; glycerol propoxylate(methoxylate-co-propoxylate) and derivatives thereof having an average molecular weight within the range of about 725 to 4,100; and glycerol propoxylate (methoxylate-β-ethoxylatetriol) and derivatives thereof having an average molecular weight within the range of about 725 to 4,800.

Examples of suitably employed ionic polymers (also termed "polyelectrolytes") include, but are not limited to, polysaccharide salts such as dextran sulfates having an average molecular weight within the range of 5,000 to 500,000, carboxymethyldextran salts, carboxymethylcellulose salts, and diethylaminoethyl dextran•HCl; polyacrylamides having an average molecular weight within the range of about 1,000 to 1,000,000; polyacrylic acids having an average molecular weight within the range of about 1,000 to 500,000; polyethylenimines having an average molecular weight within the range of about 1,000 to 50,000; and derivatives thereof. Moreover, ionic derivatives of glycogen, levan and soluble starch may be employed rather than dextran sulfate salts.

In the systems employing ionic polymers, sodium chloride or another inorganic salt may be added to the opposing phase to help render the polymer immiscible.

It is noted that if the polymer is employed at a molecular weight that is too high, the ink-jet ink may exhibit certain undesirable features such as crusting, which adversely affects pen reliability. The viscosity of the phases also increases with the molecular weight of the polymeric additive (although this increase in viscosity is partially offset by the lower concentrations required for polymers with larger molecular weights). Preferably, the viscosity of the ink-jet ink is within the range of about 2 to 15 cP. If the polymer is employed at a molecular weight that is too low, the required concentration of the polymer becomes excessive and the resulting ink-jet ink will penetrate the paper at an undesirably fast rate. Preferably the molecular weight of the polymer is relatively low, such as within the range of about 300 to 20,000, with a molecular weight within the range of about 1,000 to 5,000 being more preferred in the practice of the invention.

The so-called "second species" that, upon interaction with the polymer, co-induces aqueous phase separation, may be another polymer or a low-molecular weight component. Essentially, any compound that induces aqueous phase separation in an aqueous solution upon interaction with a polymer contained therein may serve as the second species. In any case, the second species must be substantially immiscible with the polymer against which it is to be paired. Thus, if two polymers are paired in adjacently-printed inks, the polymers must be sufficiently different to be immiscible and to thereby induce aqueous phase separation. Because of the large size of polymer molecules, phase separation occurs in polymer-polymer mixtures even for polymers that are very similar and present at very low concentrations. Factors important in determining whether two polymers are sufficiently different include the average molecular weight, polydispersity, and the concentration of the polymer in the ink. It is contemplated that routine experimentation by one having ordinary skill in the art will be sufficient to determine whether two particular polymers are sufficiently different in aqueous solution to induce aqueous phase separation.

If the second species is a low-molecular weight component, rather than a polymer, it must also be substantially immiscible with the polymer against which it is to be paired. More precisely, the presence of a low-molecular weight component in accordance with the invention results in the insolubility of the polymer, thereby inducing phase separation. This is in contradistinction to the mechanism behind phase separation by employing a second polymer, in which the immiscibility of the polymers with one another induces phase separation. Examples of low-molecular-weight components which induce aqueous phase separation when paired against polymers include, but are not limited to, salts of phosphates and sulfates; low-molecular weight alcohols such as propyl alcohol and glycerol; ethylene glycol monobutyl ether (available from Union Carbide as butyl Cellusolve™); glucose; glycol; and sodium chloride. Of these non-polymeric second species, potassium phosphate and glycol are preferred.

Thus, it is contemplated that the following polymer-second species systems may be employed to induce aqueous phase separation: (1) nonionic polymer-nonionic polymer; (2) ionic polymer-nonionic polymer; (3) ionic polymer-ionic polymer; (4) nonionic polymer-low molecular weight component; and (5) ionic polymer-low molecular weight component.

It is preferred that at least one nonionic polymer be employed in the practice of the invention. More preferably, both the polymer and paired second species are nonionic polymers. The preferred polymer-second species pairing is polyethylene glycol having an average molecular weight within the range of about 1,500 to 5,000 and another nonionic polymer such as an ethoxylated glycerol, a polyethylene glycol, a polyvinyl pyrrolidone, or dextran, with the dextran having an average molecular weight within the range of about 11,000 to 19,000. By pairing nonionic polymers in the practice of the invention, one further simplifies the formulation of the ink-jet inks, since there is no issue regarding attraction between the polymers themselves or with regard to the effect of solution pH.

However, if one chooses to pair an ionic polymer with another ionic polymer, care must be taken that the charges are similar and equal (i.e., not opposite charges), else both polymers will gravitate toward one phase while the other phase will be polymer-poor. This type of phase separation is termed "complex coacervation".

Colorant choice is not constrained in the practice of the present invention as it is in alternative bleed control methods, such as those employing divalent salts. Rather, it is contemplated that any colorant, whether dye or pigment, that may be suitably employed in ink-jet printers may be benefited by the practice of the invention. It is the formulation of the vehicle, rather than the colorant, that achieves aqueous phase separation in the practice of the invention. Thus, the choice of colorant may be made independent of such variables as its pH-sensitivity and its ionic charge state.

Examples of dyes that are suitably employed in the present ink-jet ink compositions include, but are not limited to, Food Black 2, Carla Black, Direct Black 19, Direct Black 51, Direct Black 109, Direct Black 154, Direct Blue 86, Direct Blue 199, Direct Red 9, Acid Yellow 23, Acid Blue 185, Acid Blue 9, Acid Red 17, Acid Red 52, Acid Red 249, and Reactive Red 180. The concentration of such a dye preferably ranges from about 0.1 to 7 wt %. Less than about 0.1 wt % results in an ink of unacceptable lightness, while greater than about 7 wt% results in clogging of the orifices in the ink-jet pen. More preferably, the dye is present within the range of about 0.1 to 4 wt % of the ink-jet ink composition. A mixture of dyes may also be employed.

Although it is contemplated that any pigment suitably employed in ink-jet printing may benefit from the practice of the invention, there are a very limited number of such pigments presently commercially available in ink-jet printing. One example is the black pigment contained in the black ink used in Hewlett-Packard's DeskJet 850® printer, with the black ink having a proprietary composition. It is also contemplated that a mixture of pigments may be employed. Typically, a pigment will require dispersion in an aqueous ink-jet ink solution with a dispersing agent.

It is noted that while the present method of controlling bleed between adjacently-printed ink-jet inks allows greater flexibility in formulation of such inks, particularly with regard to colorant, it does not result in an impenetrable barrier to colorant movement. The interfacial tension between the two aqueous phases is actually relatively low. For example, the interfacial tension in a dextran-polyethylene glycol-water system in which Dextran 500 is employed at 6 wt % and polyethylene glycol is employed at 4 wt % has an interfacial tension of only about 0.007 dynes/cm, as reported by Albertsson in Table 2.7 (Id. at 33). Hence, bleed control achieved in the practice of the invention is not without room for improvement.

It is contemplated that the colorant may actually be used to enhance the bleed control achieved by the present aqueous phase separation approach. In the biotechnology field, it is known to employ additional components or modifications to the solution to help "partition" a particular cell component among the aqueous phases. This technique is known as "affinity partitioning". Specifically, the technique of affinity partitioning as it is used in the field of biotechnology imparts a tendency to a particular aqueous phase to favor a particular cell component. It is envisioned, in the field of ink-jet printing, that a colorant might be tailored to prefer a particular aqueous phase over another, thereby providing an additional means of controlling bleed between adjacently-printed inks.

With regard to the components of the present ink-jet ink vehicles, aside from the polymer and second species, the present ink vehicles may contain such components as are typically found commercially in dye-based and pigment-based ink-jet ink vehicles and as are compatible with their associated colorants and other inks in the ink-jet ink set. Examples of suitable vehicle components include diols (such as 1,5-pentanediol), glycol ethers (such as diethylene glycol), and 2-pyrrolidone, among "other" components such as surfactants and biocides, a buffer, and water. However, certain typical components are rendered unnecessary by the present bleed control method, such as the use of relatively large amounts surfactants for bleed control and the use of divalent salts. More specifically, the vehicle of the dye-based ink-jet ink compositions preferably comprises the following concentrations, expressed as a percentage of total ink composition: (a) about 5 to 15 wt % 1,5-pentanediol; (b) about 5 to 15 wt % 2-pyrrolidone; (c) about 5 to 25 wt % of a polymer in accordance with the invention, most preferably about 10 wt % of polyethylene glycol having an average molecular weight of about 4,000 in one ink; and (d) water. It is further contemplated that about 2 to 3 wt % of a dye is employed with this vehicle. While this vehicle formulation is preferred, any aqueous-based vehicle suitable for ink-jet ink compositions may be benefited in the practice of the invention.

The method of the invention is system interdependent, meaning that bleed control is achieved by the interaction of inks. While the method of the invention may be employed to reduce or substantially eliminate bleed between any two inks, such as between black and yellow inks, it is preferably employed to control bleed between all four inks contained in a typical ink-jet ink set. Therefore, each of the four inks is preferably formulated such that aqueous phase separation occurs when any combination of the inks is adjacently printed on a print medium. For example, each ink in an ink-jet ink set would preferably contain a sufficiently different polymer in accordance with the invention, such that aqueous phase separation occurs between each ink of the set. It follows that black to color and color to color bleed will have been substantially reduced in such an ink set. A preferred ink-jet ink set will include the following ink-jet inks, each formulated in accordance with the invention:

TABLE 1

Preferred Ink-Jet Ink Set in Accordance with the Invention.
(All percentages are in weight percent of the total ink-jet ink composition.)

| Component | Yellow Ink-Jet Ink | Magenta Ink-Jet Ink | Cyan Ink-Jet Ink |
|---|---|---|---|
| 1,5-pentanediol | 10 | 7 | 10 |
| 2-pyrrolidone | 5 | 5 | 5 |
| PEG 4,000 | 10 | — | 8 |
| PEG methylether 2,000 | — | 20 | — |
| PEG 7,500 |  |  | 1 |
| sodium alginate | 0.1 | 0.1 | 0.1 |
| dye[1] | ● AY23-TMA (0.09) | ● AR 52-Li (0.11) | ● DB 199-TMA (0.0675) |
|  |  | ● RR 180-Na (0.0675) | ● AB9-Na (0.12) |

[1]AY23 ≡ Acid Yellow 23; AR 52 ≡ Acid Red 52; RR 180 ≡ Reactive Red 180; DB 199 ≡ Direct Blue 199; AB 9 ≡ Acid Blue 9; and parenthetical values represent absorbance characteristics of the specific dye.

The above-described preferred ink-jet ink set is preferably employed with a black ink such as employed in Hewlett-Packard's DeskJet® 850 ink-jet printer, that particular black ink being a pigment-based ink having a proprietary composition.

By employing the present approach of controlling bleed, one is afforded more flexibility in ink-jet ink formulation, not only with regard to the colorant, but also with regard to other materials which were formerly precluded by more constraining bleed control methods employing divalent metal ions or low pH. For example, such materials as the alginic acids and sodium alginates of low to high viscosities may now be added in very small amounts (i.e., about 0.10 to 0.20 wt %), where these materials help prevent the colorant from bleeding into an adjacent aqueous phase. The utility of alginates has been recognized in ink-jet ink compositions (see, e.g., U.S. Pat. No. 5,133,803), but the presence of alginates has heretofore often been precluded by the resident bleed control method. It is contemplated that other substances as yet unknown may likewise be added to the present ink-jet ink compositions to also aid in preventing the colorant from bleeding across the interfacial boundary between aqueous phases.

Consistent with the requirements for this invention, various other types of additives may be employed in the dye-based and pigment-based ink-jet ink compositions to optimize the properties of the ink composition for specific applications. Examples of such additives include buffers, biocides, and the like, each of which are commonly employed additives in ink-jet ink compositions. Examples of preferably-employed buffers include but are not limited to a tris amine buffer such as tris(hydroxymethyl)aminomethane, which is available from, for example, Aldrich Chemical (Milwaukee, Wis.), and 4-morpholine ethane sulfonic acid (MES). Any of the biocides commonly employed in ink-jet inks may be employed in the practice of the invention, such as NUOSEPT 95, available from Hüls America (Piscataway, N.J.); PROXEL GXL, available from ICI Americas (Wilmington, Del.); and glutaraldehyde, available from Union Carbide Company (Bound Brook, N.J.) under the trade designation UCARCIDE 250. PKOXEL GXL is the preferred biocide. Anti-kogation of the inks may be achieved by well-known substitution of cations on certain dyes with other cations as well as by the inclusion of one or more anti-kogation agents. Anti-kogating agents are well-known and form no part of this invention.

While the present inks contain little or no surfactant, since surfactants are not necessary for bleed control, the present inks may require some amount of surfactant for other purposes, albeit a lesser amount than was necessary for bleed control. More specifically, a relatively small amount of surfactant may be employed to enhance dry time in the ink as well as to balance the surface tension between inks. It is important that the surface tension between inks formulated in accordance with the invention is balanced. The presence of surfactants in adjacently-printed inks at sufficient concentration to effect bleed control greatly decreases the surface tension of both inks such that any surface tension imbalance therebetween is trivialized. When, as here, surfactants are not employed for bleed control and are employed at relatively low concentrations to simply improve dry time, surface tension imbalance between inks becomes a concern. An imbalance between surface tensions between adjacently-printed inks may lead to a surface tension gradient, which may undesirably lead to flow between such inks regardless of the present bleed control measures.

The polymer and secondary species must be employed at appropriate concentrations in relation to one another to achieve aqueous phase separation. The appropriate concentrations are different for different polymer-secondary species pairs. Factors affecting the concentrations include the solvent compositions of the inks, temperature, types of other additives in the ink-jet ink composition, and, perhaps most importantly, the molecular weight distribution of the polymer and the solubility of the polymeric species in aqueous solution. The higher the molecular weight of the polymer, the lower the concentration is required for phase separation; conversely, the lower the molecular weight, the higher the concentration required for phase separation. Thus, there is an inverse relationship between the molecular weight of the polymer and its preferred concentration. For instance, with regard to employing polyethylene glycol as the polymer, molecular weights of about 7,500 or greater are usually quite effective at 7.5 wt % or lower. When the molecular weight of the polyethylene glycol is about 2,000 or less, concentrations in excess of 15 to 20 wt % of the ink are typically needed to achieve aqueous phase separation. A similar concentration/molecular weight relationship exists for other polymers such as dextran and Ficoll®.

The effect of temperature on the formation of different aqueous phases varies. Some polymer-second species systems achieve aqueous phase separation over a wide range of temperatures, while others require different concentrations at higher temperatures to achieve aqueous phase separation. For example, Albertsson discloses that a system of polyethylene glycol and potassium phosphate requires smaller concentrations of polymer at higher temperatures, while a system of dextran-methylcellulose remains essentially unaffected by temperature.

The appropriate concentrations for a particular pair of polymer and secondary species may be readily determined by routine experimentation. For example, FIG. 1 represents a phase diagram constructed experimentally for a system pairing polyethylene glycol having an average molecular weight of about 4,000 with dextran having an average molecular weight of about 11,500. More specifically, various amounts of PEG 4,000 and dextran 11,500 were added to a vehicle consisting of 7.5 wt % 1,5-pentanediol, 5 wt % 2-pyrrolidone, and the balance water. In each case, the solution was shaken until the PEG 4,000 and dextran 11,500 appeared soluble, and then the solution was allowed to stand, allowing one to observe any development of aqueous phase separation. In FIG. 1, the points marked "x" indicate concentrations at which there was no phase separation, while the points marked "⊗" indicate concentrations at which phase separation occurred. Given a sufficient number of data points, one may determine the approximate dividing line between those concentrations resulting in aqueous phase separation and those not resulting in such separation. Thus, one may similarly determine, for any given pairing of polymer and second species and for a given vehicle composition, the appropriate relational concentrations that may be employed to induce aqueous phase separation in accordance with the invention.

To formulate an ink in accordance with the invention, one generally need only mix the selected ingredients together using conventional mixing techniques. However, if the polymer employed is one having a relatively high molecular weight, one may need to heat it to form a stock solution that may then be added to the remaining ingredients of the contemplated ink-jet ink composition for mixing. For example, certain high molecular weight dextrans may require heating, preferably to about 60° C., prior to inclusion in the ink-jet ink composition.

In sum, the present method involves modification of at least two ink-jet ink vehicle formulations to bring about the desired effect of bleed control therebetween. The polymer is incorporated in one ink-jet ink and the second species, being immiscible with the polymer, is incorporated in a second ink-jet ink to induce aqueous phase separation of the inks, resulting in an interfacial boundary therebetween that discourages bleed.

The present approach to bleed control is advantageous over other known methods for at least the following reasons: (1) greater ink formulation flexibility in the absence of large amounts of metal ions and acids formerly used to achieve bleed control; (2) greater holdup of colorant on the print medium surface resulting in brighter colors; (3) reduction in amount of colorant needed in ink-jet ink given greater colorant holdup, leading to cost savings and better pen performance; (4) improved edge acuity in the absence of large amounts of surfactants; (5) absence of undesirable halo between black and color inks (i.e., color bleed into the black ink) given better surface tension balance therebetween in the absence of large amounts of surfactants; (6) better material compatibility in the absence of large amounts of surfactants and organic acids; (7) reduced paper cockle given that the amount of polymer used in the practice of the invention replaces a certain amount of water in the ink-jet ink; (8) potential reduction in aerosol; (9) better media independence; (10) reduction in ink puddling on the nozzle plate; and (11) increased flexibility in drytime control. Furthermore, the present approach is environmentally friendly and employs materials that are relatively safe to handle during manufacture.

The advantages realized in the practice of the invention are illustrated in the examples below.

EXAMPLES

The figures illustrate the efficacy of employing aqueous phase separation in accordance with the invention to controlling bleed between adjacently-printed ink-jet inks.

FIGS. 2–4 depict the image resulting from pipetting a drop or two each of a yellow and cyan ink adjacent one another onto several folded layers of KIMWIPE™ tissue material after allowing the absorbed inks to bleed into one another. Similarly, FIG. 5 depicts the image resulting from pipetting a drop or two each of cyan and magenta inks adjacent one another while FIG. 6 represents yellow and black inks. While any combination of color and black inks might have been used to illustrate the benefits of practicing the invention, yellow and cyan inks were employed for their contrast as well as for their ability to form the secondary color green upon mixing, so that bleed would be readily observable and visibly quantifiable. Likewise, the cyan and magenta inks of FIG. 5 contrast well, forming purple upon mixing so that bleed is readily observable. In each case, the inks were allowed to dry before the test was considered complete, with drying time being about 15 minutes.

Example 1

Figure 2A:
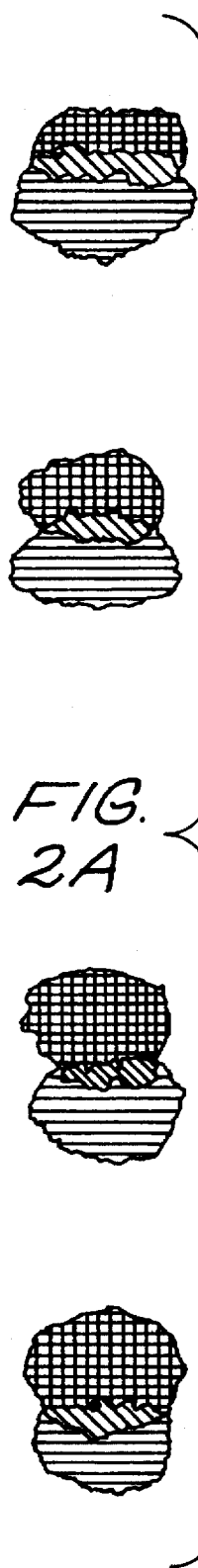
Figure 2B:
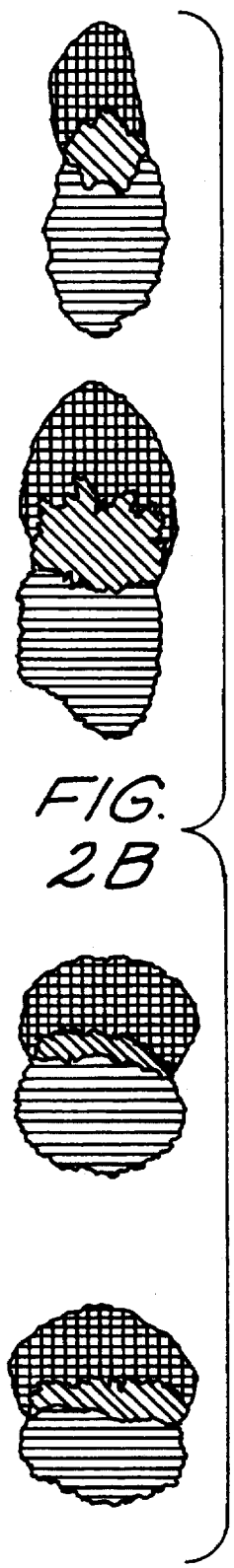

FIG. 2A illustrates the bleed control achieved between a yellow ink (represented by perpendicular cross-hatching) and a cyan ink (represented by thin horizontal lines) formulated to respectively include dextran and polyethylene glycol, while FIG. 2B illustrates the bleed that occurs between a yellow ink and a cyan ink without employing the method of the invention. The compositions of these four inks were as follows:

TABLE 2

Ink-Jet Ink Compositions of FIGS. 2A and 2B.
(All percentages are in weight percent of total ink composition.)

| | FIG. 2A | | FIG. 2B | |
| --- | --- | --- | --- | --- |
| Component | Yellow Ink | Cyan Ink | Yellow Ink | Cyan Ink |
| Dye[(1)] | TMA AY23 (0.09 abs) | • TMA DB199 (0.06 abs) • Na AB9 (0.15 abs) | TMA AY23 (0.09 abs) | • TMA DB199 (0.0675 abs) • Na AB9 (0.12 abs) |
| 1,5 pentanediol | 7 wt % | — | 7 wt % | 7 wt % |
| 2-pyrrolidone | 5 wt % | 8 wt % | 5 wt % | 5 wt % |
| isopropyl alcohol | — | 4 wt % | — | — |
| polymer | 10 wt % dextran 70,000 | 8 wt % PEG 7500 | — | — |
| water | balance | balance | balance | balance |

[(1)]"abs" ≡ absorbance

Referring to FIG. 2B, the bleed between the yellow and cyan inks is quite evident from the amount of green (represented by thin diagonal lines) formed upon their intermixing as well as the ragged border therebetween. In comparison, the yellow and cyan inks depicted in FIG. 2A show a marked reduction in the amount of green formed, indicative of reduced bleeding between the inks.

Example 2

Figure 3A:

Turning to the comparisons of FIG. 3, FIG. 3A illustrates the bleed control achieved between a yellow ink (represented by perpendicular cross-hatching) and a cyan ink (represented by thin horizontal lines) formulated to respectively include Ficoll® and polyethylene glycol, while FIG. 2B illustrates the bleed that occurs between a yellow ink and a cyan ink without employing the method of the invention. The compositions of these four inks were as follows:

TABLE 3

Figure 3B:
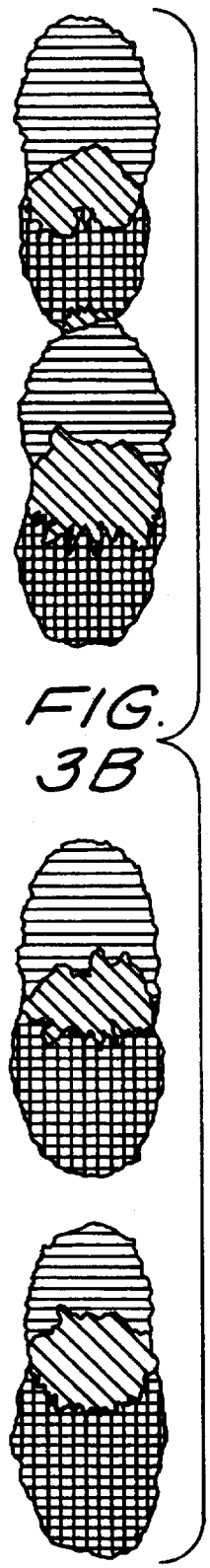

Ink-Jet Ink Compositions of FIGS. 3A and 3B.
(All percentages are in weight percent of total ink composition.)

| Component | FIG. 3A | | FIG. 3B | |
|---|---|---|---|---|
| | Yellow Ink | Cyan Ink | Yellow Ink | Cyan Ink |
| Dye[1] | TMA AY23 (0.09 abs) | • TMA DB199 (0.06 abs) • Na AB9 (0.15 abs) | TMA AY23 (0.09 abs) | • TMA DB199 (0.0675 abs) • Na AB9 (0.12 abs) |
| 1,5 pentanediol | 7 wt % | — | 7 wt % | 7 wt % |
| 2-pyrrolidone | 5 wt % | 8 wt % | 5 wt % | 5 wt % |
| isopropyl alcohol | — | 4 wt % | — | — |
| polymer | 15 wt % Ficoll® 400K | 8 wt % PEG 7500 | — | — |
| water | balance | balance | balance | balance |

[1]"abs" ≡ absorbance

Referring to FIG. 3B, the bleed between the yellow and cyan inks is again evident from the amount of green (represented by thin diagonal lines), essentially validating the results of FIG. 2B by using the same ink compositions.

In comparison, the yellow and cyan inks depicted in FIG. 3A show a marked reduction in the amount of green formed, indicative of reduced bleeding between the inks. Therefore, bleed control is achieved by pairing polyethylene glycol 7500 with both Dextran 70K in FIG. 2A and Ficoll® 400K in FIG. 3A.

Example 3

To illustrate that the method of the invention is effective with pigments as well as dyes, FIG. 4 compares the bleed control achieved for a pigment-based ink employing paired polymers with control pigment-based inks. The compositions of the four inks employed in FIGS. 4A and 4B were as follows:

TABLE 4

Ink-Jet Ink Compositions of FIGS. 4A and 4B.
(All percentages are in weight percent of total ink composition.)

| Component | FIG. 4A | | FIG. 4B | |
|---|---|---|---|---|
| | Yellow Ink | Cyan Ink | Yellow Ink | Cyan Ink |
| Pigment | 2 wt % Pigment Yellow | 2 wt % Pigment Blue | 2 wt % Pigment Yellow | 2 wt % Pigment Blue |
| 1,5 pentanediol | 5 wt % | 5 wt % | 7 wt % | 7 wt % |
| 2-pyrrolidone | 5 wt % | 5 wt % | 5 wt % | 5 wt % |
| polymer | 20 wt % PEG methyl ether 2000 | 25 wt % PEG 1540 | — | — |
| water | balance | balance | balance | balance |

Referring to FIG. 4B, the bleed between the yellow (represented by perpendicular cross-hatching) and cyan (represented by thin horizontal lines) inks is again evident from the amount of green (represented by thin diagonal lines) resulting from their intermixing on the tissue material. In comparison, the yellow and cyan inks depicted in FIG. 4A show a reduction in the amount of green formed, indicative of reduced bleeding between the inks. Therefore, bleed control is achieved between pigment-based inks using aqueous phase separation. Moreover, it is demonstrated that aqueous phase separation may be achieved when the polymer and the second species, here PEG methyl ether 2000 and PEG 1450, are similar in nature.

Example 4

FIG. 5 employs magenta and cyan pigment-based inks to illustrate the bleed control achieved in the practice of the invention. The compositions of the four inks employed in FIGS. 5A and 5B were as follows:

TABLE 5

Ink-Jet Ink Compositions of FIGS. 5A and 5B.
(All percentages are in weight percent of total ink composition.)

|  | FIG. 5A | | FIG. 5B | |
| --- | --- | --- | --- | --- |
| Component | Magenta Ink | Cyan Ink | Magenta Ink | Cyan Ink |
| Pigment | 2 wt % Pigment Red | 2 wt % Pigment Blue | 2 wt % Pigment Red | 2 wt % Pigment Blue |
| 1,5 pentanediol | — | — | 5 wt % | 5 wt % |
| 2-pyrrolidone | 9 wt % | 9 wt % | 5 wt % | 5 wt % |
| polymer | 5 wt % Dextran 500,000 | 7.5 wt % PEG 7500 | — | — |
| water | balance | balance | balance | balance |

Referring to FIG. 5B, the bleed between the magenta (represented by thin vertical lines) and cyan (represented by thin horizontal lines) inks is clearly evident from the amount of purple (represented by dashed vertical lines) therebetween, which resulted from the intermixing of the magenta and cyan upon their bleed into one another on the tissue material. Therefore, the border between the magenta and cyan is undesirably ragged. In comparison, the magenta and cyan inks depicted in FIG. 5A show a marked reduction in the amount of purple formed as well as a substantially cleaner border between the two inks. Therefore, bleed control is achieved between pigment-based inks by pairing dextran 500,000 and PEG 7500 to achieve aqueous phase separation.

Example 5

Figures 6A, 6B:
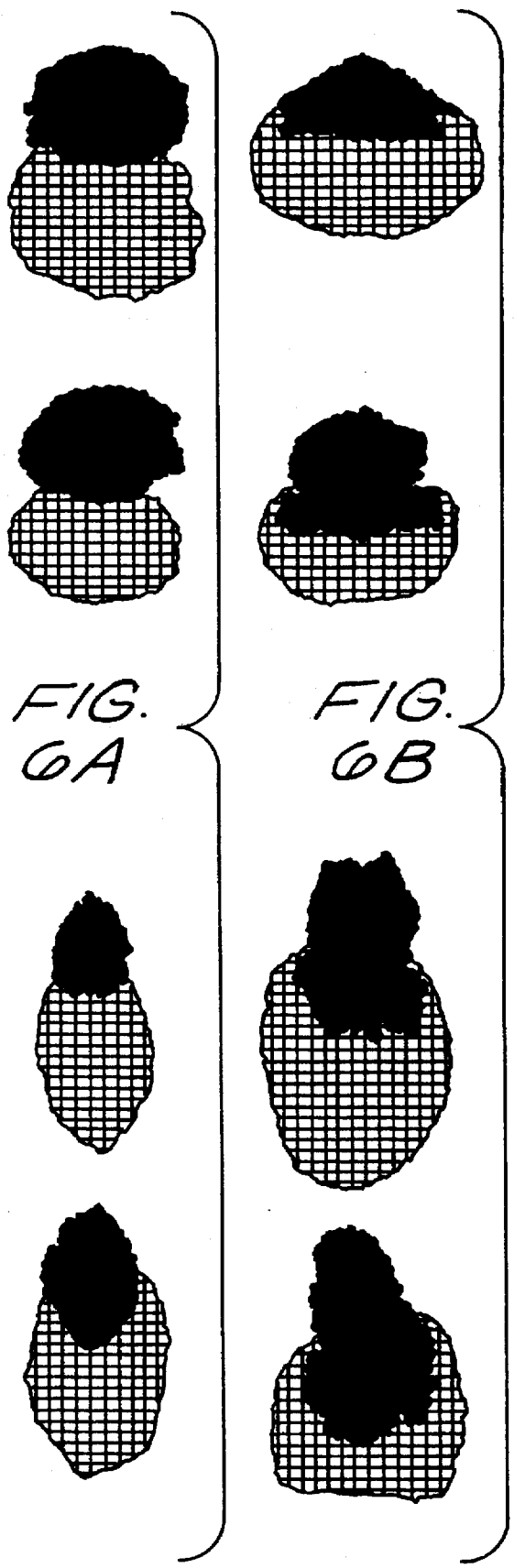

FIG. 6 employs yellow (represented by perpendicular cross-hatching) and black inks to illustrate the bleed control achieved in the practice of the invention between a dye-based ink and a pigment-based ink. More specifically, the black ink is a pigment-based ink having a proprietary composition that is employed in Hewlett-Packard's DeskJet® 850 ink-jet printer. This black ink contains substances of a polymeric nature that serve as a so-called "second species" when paired with the polymeric components in the yellow inks. FIG. 6A employs a separate yellow ink-jet ink composition for its top two tests as opposed to its bottom two tests, while FIG. 6B employs a single yellow ink-jet ink composition for all four of its tests. The compositions of the three yellow inks employed in FIGS. 6A and 6B were as follows:

TABLE 6

Yellow Ink-Jet Ink Compositions of FIGS. 6A and 6B.
(All percentages are in weight percent of total ink composition.)

|  | FIG. 6A | | FIG. 6B |
| --- | --- | --- | --- |
| Component | Top Yellow Ink | Bottom Yellow Ink | Yellow Ink |
| Dye | TMA AY23 (0.09 abs) | TMA AY23 (0.09 abs) | TMA AY-23 (0.09 abs) |
| 1,5 pentanediol | 7 wt % | 7 wt % | 7 wt % |
| 2-pyrrolidone | 5 wt % | 5 wt % | 5 wt % |
| polymer | 10 wt % Dextran 70K | 15 wt % Ficoll ® 400K | — |
| water | balance | balance | balance |

Referring to FIG. 6B, the bleed between the yellow and black inks is clearly evident in the amount of black ink that invades the yellow ink as well as the extremely ragged border therebetween. In comparison, the yellow and black inks depicted in FIG. 6A show a marked reduction in the amount of black invasion into the yellow area as well as a substantially cleaner borderline between the two inks. Therefore, bleed control was achieved between a yellow-dye based ink and a black pigment-based ink by employing either dextran having an average molecular weight of about 70,000 or Ficoll® having an average molecular weight of about 400,000.

FIGS. 7–11 depict the image resulting from various inks being deposited by Hewlett-Packard's DeskJet 850® printer with a tri-chamber color pen. More specifically, the printer carries two pens. One of the pens was a tri-chamber pen and the other was a single-chamber pen. The tri-chamber pen was employed to print color (e.g., yellow) ink while the single-chamber pen was employed to print black ink for evaluation of black to color bleed. Unless otherwise noted below, the print medium employed was Champion DataCopy™ paper.

Example 6

Figure 7A:
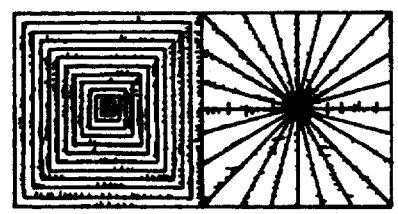
FIGS. 7–10 are line drawings illustrating the bleed occurring when a yellow ink-jet ink is printed onto Champion Datacopy paper and cross-hatched by a black ink-jet ink, with FIGS. 7A–10A representing yellow and black ink-jet inks having compositions outside the scope of the invention, e.g., without polymeric additive, and FIGS. 7B–10B representing ink-jet inks formulated in accordance with the invention.
Figure 7B:
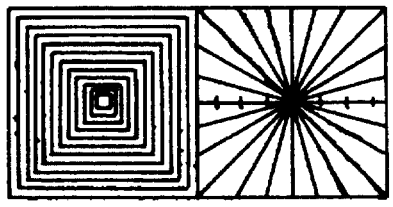

Turning to FIG. 7, FIGS. 7A and 7B depict yellow areas (represented as the white area within the squares) that have been cross-hatched by black ink. The black ink is the pigment-based ink employed in FIG. 6 above having a proprietary composition that is employed in Hewlett-Packard's DeskJet® 850 ink-jet printer. This black ink contains substances of a polymeric nature that serve as a so-called "second species" when paired with the polymeric components in the yellow inks. The compositions of the yellow inks employed in FIGS. 7A and 7B were as follows:

TABLE 7

Yellow Ink-Jet Ink Compositions of FIGS. 7A and 7B.
(All percentages are in weight percent of total ink composition.)

| Component | Yellow Inks | |
|---|---|---|
| | FIG. 7A | FIG. 7B |
| Dye | TMA AY23 (0.08 abs) | TMA AY-23 (0.09 abs) |
| 1,5 pentanediol | — | 7 wt % |
| 2-pyrrolidone | 8 wt % | 5 wt % |
| isopropyl alcohol | 4 wt % | 4 wt % |
| polymer | — | 25 wt % PEG methyl ether 1450 |
| water | balance | balance |

The yellow ink of FIG. 7A suffers fairly extensive invasion from the black ink in the absence of a polymer to be paired with the polymeric components in the black ink. However, in comparison, the yellow ink of FIG. 7B remains substantially clear of bleed from the black ink. Therefore, by incorporating the polyethylene glycol methyl ether in the yellow ink, aqueous phase separation is achieved when the yellow ink is adjacently printed to the black ink.

Example 7

Figure 8A:
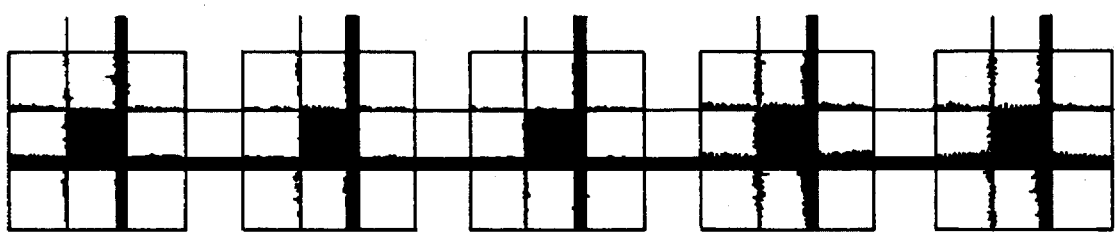
Figure 8B:
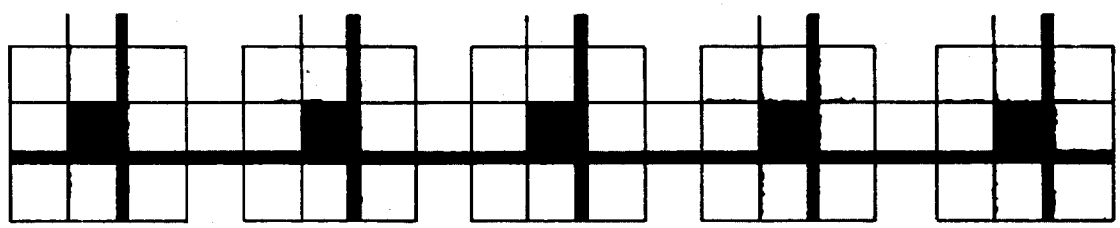

FIGS. 8A and 8B depict the same inks employed in FIGS. 7A and 7B, respectively, as printed using a different print file. More specifically, the square white areas of FIGS. 8A and 8B represent white areas that were cross-hatched by black pigment-based ink. The print file employed in printing FIGS. 8A and 8B resulted in a greater amount of ink being deposited onto the print medium than in FIGS. 7A and 7B, such that bleed is more likely to occur in FIGS. 8A and 8B. However, there is clearly a substantial reduction in bleed in FIG. 8B compared to FIG. 8A, illustrating that the method of the invention remains effective even in the face of larger amounts of ink being deposited down adjacently.

Example 8

Figure 9A:
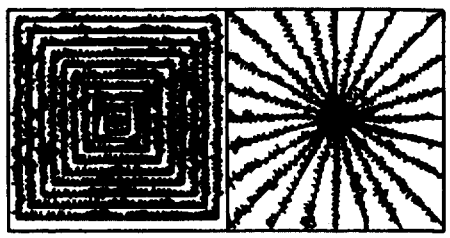
Figure 9B:
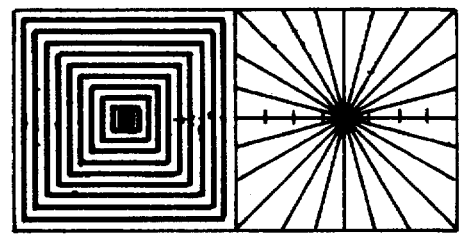

Turning to FIG. 9, FIGS. 9A and 9B depict yellow areas (represented as the white area within the squares) that have been cross-hatched by black ink. Whereas the control yellow ink only contains dye and 2-pyrrolidone, the yellow ink formulated in accordance with the invention includes both isopropyl alcohol and a polymer. The black ink is the pigment-based ink employed in FIGS. 6-8 above having a proprietary composition that is employed in Hewlett-Packard's DeskJet® 850 ink-jet printer. The compositions of the yellow inks employed in FIGS. 9A and 9B were as follows:

TABLE 8

Yellow Ink-Jet Ink Compositions of FIGS. 9A and 9B.
(All percentages are in weight percent of total ink composition.)

| Component | Yellow Inks | |
|---|---|---|
| | FIG. 9A | FIG. 9B |
| Dye | TMA AY23 (0.128 abs) | Na DY132[1] (0.08 abs) |
| 2-pyrrolidone | 8 wt % | 8 wt % |
| isopropyl alcohol | — | 4 wt % |
| 1,5-pyrrolidone | — | 5 wt % |
| polymer | — | 8 wt % PEG 7500 |
| water | balance | balance |

[1]Na DY 132 ≡ Direct Yellow 132 dye associated with sodium.

FIG. 9A demonstrates the extensive bleed occurring between the black pigment-based ink and the yellow ink formulated outside the scope of the invention. In comparison, FIG. 9B is substantially bleed-free given the induction of aqueous phase separation deriving from the interaction of the PEG 7500 in the yellow ink and the polymeric components in the black pigment-based ink. It is noted that the ink of FIG. 9B employs isopropyl alcohol to achieve an improvement in dry time.

Example 9

Figure 10A:
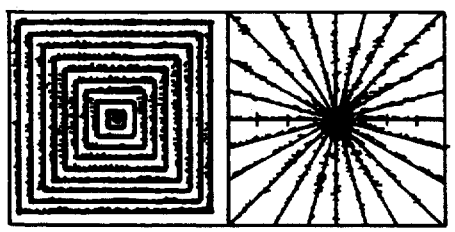
Figure 10B:
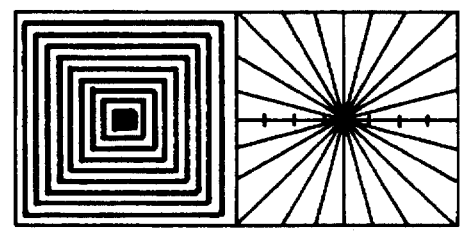

FIG. 10 illustrates that the addition of a highly penetrating solvent to the control ink by itself does not effectively control bleed. Again, FIGS. 10A and 10B depict yellow areas (represented as the white area within the squares) that have been cross-hatched by black ink. Again, the black ink is the pigment-based ink employed in FIGS. 6-9 above having a proprietary composition that is employed in Hewlett-Packard's DeskJet® 850 ink-jet printer. The compositions of the yellow inks employed in FIGS. 10A and 10B were as follows:

TABLE 9

Yellow Ink-Jet Ink Compositions of FIGS. 10A and 10B.
(All percentages are in weight percent of total ink composition.)

| Component | Yellow Inks | |
|---|---|---|
| | FIG. 10A | FIG. 10B |
| Dye | TMA AY23 (0.08 abs) | TMA AY23 (0.08 abs) |
| 1,5-pentanediol | — | 7 wt % |
| 2-pyrrolidone | 8 wt % | 5 wt % |
| isopropyl alcohol | 4 wt % | 4 wt % |
| polymer | — | 8 wt % PEG 7500 |
| water | balance | balance |

FIG. 10A demonstrates a substantial amount of bleed occurred between the yellow ink and the black ink in the absence of aqueous phase separation, even with the addition of 4 wt % isopropyl alcohol. By incorporating PEG 7500 in the yellow ink of FIG. 10B to interact with the polymeric components in the black ink, aqueous phase separation was induced and bleed was substantially eliminated.

Example 10

Figure 11A:
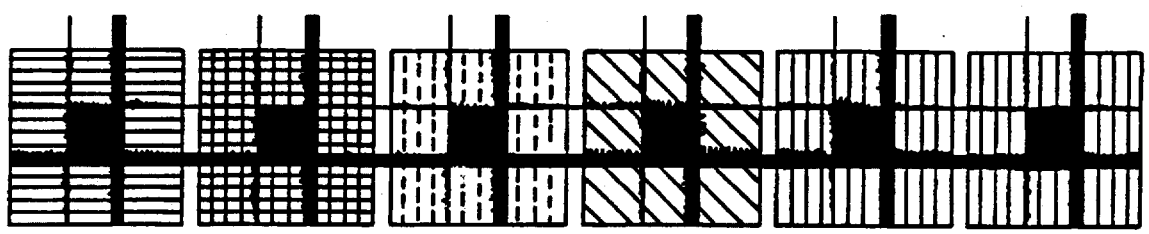
Figure 11B:
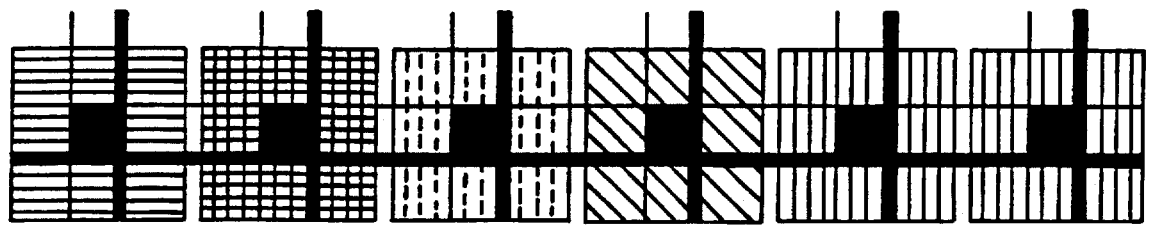

FIG. 11 illustrates the bleed control achieved in the practice of the invention for a variety of colors that were cross-hatched by the black pigment-based ink employed in FIGS. 6–10. More specifically, from left to right in both FIGS. 11A and 11B, the following colors were printed as an area fill and subsequently cross-hatched by the black pigment-based ink: blue (represented by thin horizontal lines); yellow (represented by perpendicular cross-hatching); purple-pink (represented by vertical dashed lines); green (represented by thin diagonal lines); and two essentially red area fills (represented by thin vertical lines). These colors were printed using yellow, cyan, and magenta ink-jet inks having the following compositions for FIGS. 11A and 11B, respectively:

ink-jet inks were formulated having relatively low viscosities of 4.4 cP and 2.8 cP, respectively, and of which only the cyan ink contained a polymeric additive, namely 10 wt % LEG. The bleed between these low viscosity inks was compared to that between yellow and cyan ink-jet inks formulated to include 10 wt % of polyvinyl pyrrolidone and 10 wt % LEG, respectively. More specifically, the inks had the following compositions:

Table 10

Color Ink-Jet Ink Compositions of FIGS. 11A and 11B.
(All percentages are in weight percent of total ink composition.)

| | FIG. 11A | | | FIG. 11B | | |
|---|---|---|---|---|---|---|
| Component | Yellow | Cyan | Magenta | Yellow | Cyan | Magenta |
| Dye | TMA AY23 (0.08) | Na AB9 (0.26) | Na AR52 (0.18) | TMA AY23 (0.08) | • Na AB9 (0.15) • TMA DB199 (0.06) | • NaAR52 (0.10) • Na RR180 (0.076)[(1)] |
| 1,5-pentanediol | — | — | — | 7 wt % | 7 wt % | 7 wt % |
| 2-pyrrolidone | 8 wt % | 8 wt % | 8 wt % | 5 wt % | 5 wt % | 5 wt % |
| isopropyl alcohol | 4 wt % | 4 wt % | 4 wt % | 4 wt % | 4 wt % | 4 wt % |
| polymer | — | — | — | 8 wt % PEG 7500 | 8 wt % PEG 7500 | 8 wt % PEG 7500 |
| water | balance | balance | balance | balance | balance | balance |

[(1)]NaRR180 (0.076) ≡ Reactive Red 180 dye associated with sodium having an absorbance in the ink-jet ink of 0.076.

FIG. 11A demonstrates that substantial bleed occurs between the black pigment-based ink and color inks formulated outside the scope of the invention, i.e., without a polymer component. In comparison, the color inks of FIG. 11B are each substantially bleed-free given the induction of aqueous phase separation deriving from the interaction of the PEG 7500 and the polymeric components in the black pigment-based ink.

Example 11

To illustrate that the bleed control achieved in the practice of the invention is the result of polymer/polymer non-mixing, rather than a mere viscosity effect, yellow and cyan

TABLE 11

Ink-Jet Ink Compositions of Example 11.
(All percentages are in weight percent of total ink composition.)

| | With Polymer Pair | | Without Polymer Pair | |
|---|---|---|---|---|
| Component | Yellow Ink | Cyan Ink | Yellow Ink | Cyan Ink |
| Dye[(1)] | TMA AY 23 (0.09 abs) | • TMA DB199 (0.0675 abs) • Na AB9 (0.12 abs) | TMA AY23 (0.09 abs) | • TMA DB199 (0.0675 abs) • Na AB9 (0.12 abs) |
| 1,5 pentanediol | 10 wt % | 7 wt % | 7 wt % | 7 wt % |
| 2-pyrrolidone | 5 wt % | 5 wt % | 5 wt % | 5 wt % |
| polymer | 10 wt % PVP 10000[(1)] | 10 wt % LEG | — | 10 wt % LEG |
| water | balance | balance | balance | balance |

[(1)]PVP = polyvinyl pyrrolidone

When the yellow and cyan inks in which the yellow ink contained no polymeric component were printed adjacently one another using Hewlett-Packard's DeskJet® 850 ink-jet printer, substantial bleed occurred, even given their similarly low viscosities. In comparison, the yellow and cyan ink-jet inks containing polymeric components evidenced a marked reduction in bleed when printed adjacently to one another.

Example 12

Yellow and cyan ink-jet inks were formulated having the following compositions and were printed adjacently to one another using Hewlett-Packard's DeskJet® 850 ink-jet printer:

TABLE 12

Ink-Jet Ink Compositions of Example 12.
(All percentages are in weight percent of total ink composition.)

| Component | With Polymer Pair | | Without Polymer Pair | |
|---|---|---|---|---|
| | Yellow Ink | Cyan Ink | Yellow Ink | Cyan Ink |
| Dye | TMA AY 23 (0.09 abs) | • TMA DB199 (0.0675 abs) • Na AB9 (0.12 abs) | TMA AY23 (0.09 abs) | • TMA DB199 (0.0675 abs) • Na AB9 (0.12 abs) |
| 1,5 pentanediol | 7 wt % | 7 wt % | 7 wt % | 7 wt % |
| 2-pyrrolidone | 5 wt % | 5 wt % | 5 wt % | 5 wt % |
| polymer | 10 wt % PVP 4000 | 8 wt % PVP 10000 | — | 8 wt % PVP 10000 |
| water | balance | balance | balance | balance |

There was substantially less bleed between the yellow and cyan inks respectively containing PEG 4000 and PVP 10000 than between the yellow and cyan inks in which the yellow contained no polymeric component.

Example 13

This example, like Example 11 above, illustrates that viscosity characteristics of the inks are not the primary source of bleed control observed in the practice of the invention. More specifically, the yellow and cyan ink-jet inks of Example 12 were formulated with the only change being to replace the 8 wt % PVP 10000 of the cyan ink with 10 wt % PVP 24000. The viscosity of the cyan ink of Example 11 was 3.4 cP, but the cyan ink of the present example had a viscosity of about 8.5 cP. Regardless, there was very little difference in the amount of bleed control achieved between the inks of Example 11 and the present inks, despite the large difference in viscosity.

Example 14

Yellow and cyan inks having the following compositions were formulated and printed adjacently to one another using Hewlett-Packard's DeskJet® 850 printer:

TABLE 13

Ink-Jet Ink Compositions of Example 14.
(All percentages are in weight percent of total ink composition.)

| Component | Yellow Ink | Cyan Ink |
|---|---|---|
| Dye | TMA AY23 (0.09 abs) | ● TMA DB199 (0.0675 abs) ● Na AB9 (0.12 abs) |
| 1,5-pentanediol | 7 wt % | 7 wt % |
| 2-pyrrolidone | 5 wt % | 5 wt % |
| polymer | 10 wt % PEG 4000 | 10 wt % LEG |
| water | balance | balance |

Reduced bleed was evident between the above-described yellow and cyan ink formulations as compared to yellow and cyan inks without aqueous phase separation induced by the presence of two different polymers.

Example 15

The yellow and cyan inks of Example 14 were formulated with the exception that 0.1 wt % sodium alginate was added to the cyan ink composition, increasing the viscosity of the cyan ink to greater than 4 cP. As a result of the addition of sodium alginate, the bleed between the present yellow and cyan inks was slightly improved over that of Example 14.

Example 16

Yellow and cyan inks having the following compositions were formulated and printed adjacently to one another using Hewlett-Packard's DeskJet® 850 printer:

TABLE 14

Ink-Jet Ink Compositions of Example 16.
(All percentages are in weight percent of total ink composition.)

| Component | With Polymer Pair | | Without Polymer Pair | |
|---|---|---|---|---|
| | Yellow Ink | Cyan Ink | Yellow Ink | Cyan Ink |
| Dye | TMA AY 23 (0.09 abs) | • TMA DB199 (0.0675 abs) • Na AB9 (0.12 abs) | TMA AY23 (0.09 abs) | • TMA DB199 (0.0675 abs) • Na AB9 (0.12 abs) |
| 1,5 pentanediol | 7 wt % | 7 wt % | 7 wt % | 7 wt % |
| 2-pyrrolidone | 5 wt % | 5 wt % | 5 wt % | 5 wt % |
| isopropyl alcohol | — | 4 wt % | — | 4 wt % |
| polymer | 10 wt % PVP 4000 | 5 wt % dextran 40000 | — | 5 wt % dextran 40000 |
| water | balance | balance | balance | balance |

There was substantially less bleed between the yellow and cyan inks respectively containing PEG 4000 and dextran 40000 than between the yellow and cyan inks in which the yellow contained no polymeric component.

Example 17

The yellow and cyan inks of Example 16 were formulated with the exceptions that (1) the 10 wt % PEG 4000 of the yellow ink was replaced by 10 wt % polyvinyl pyrrolidone having an average molecular weight of about 10,000 and (2) the 7 wt % 1,5-pentanediol of the yellow ink was increased to 10 wt % 1,5-pentanediol. The degree of bleed control achieved between the yellow and cyan inks respectively containing PVP 10000 and dextran 40000 was similar to that achieved in Example 16 between the yellow and cyan inks respectively containing PEG 4000 and dextran 40000.

Example 18

To illustrate that a polymer having a relatively low molecular weight may be used in the practice of the invention, the following yellow and cyan inks were formulated and printed adjacently to one another using Hewlett-Packard's DeskJet® 850 printer:

TABLE 15

Ink-Jet Ink Compositions of Example 18.
(All percentages are in weight percent of total ink composition.)

| Component | With Polymer Pair | | Without Polymer Pair | |
|---|---|---|---|---|
| | Yellow Ink | Cyan Ink | Yellow Ink | Cyan Ink |
| Dye | TMA AY 23 (0.09 abs) | • TMA DB199 (0.0675 abs) • Na AB9 (0.12 abs) | TMA AY23 (0.09 abs) | • TMA DB199 (0.0675 abs) • Na AB9 (0.12 abs) |
| 1,5 pentanediol | 7 wt % | 7 wt % | 7 wt % | 7 wt % |
| 2-pyrrolidone | 5 wt % | 5 wt % | 5 wt % | 5 wt % |
| polymer | 10 wt % PEG 4000 | 30 wt % PEG 300 | — | — |
| water | balance | balance | balance | balance |

There was substantially less bleed between the yellow and cyan inks respectively containing PEG 4000 and PEG 300 than between the yellow and cyan inks containing no polymeric components. Therefore, it is demonstrated that different molecular weights of the same compound, namely polyethylene glycol, may be paired with one another to achieve aqueous phase separation and, accordingly, bleed control in the practice of the invention.

Example 19

The following yellow and cyan inks were formulated and printed adjacently to one another using Hewlett-Packard's DeskJet® 850 printer:

TABLE 16

Ink-Jet Ink Compositions of Example 19.
(All percentages are in weight percent of total ink composition.)

| | With Polymer Pair | | Without Polymer Pair | |
|---|---|---|---|---|
| Component | Magenta Ink | Yellow Ink | Magenta Ink | Yellow Ink |
| Dye | • NaAR52 (0.11) • Na RR180 (0.0675) | TMA AY23 (0.09) | • NaAR52 (0.11) • Na RR180 (0.0675) | TMA AY23 (0.09 abs) |
| 1,5 pentanediol | 7 wt % | 7 wt % | 7 wt % | 7 wt % |
| 2-pyrrolidone | 5 wt % | 5 wt % | 5 wt % | 5 wt % |
| polymer | 12 wt % Ficoll® 70000 | 10 wt % PEG 4000 | 12 wt % Ficoll® 70000 | — |
| water | balance | balance | balance | balance |

There was substantially less bleed between the magenta and yellow inks respectively containing Ficoll® 70000 and PEG 4000 than between the magenta and yellow inks in which the yellow ink contained no polymeric components.

Example 20

The magenta and yellow inks of Example 19 were formulated with the exceptions that (1) the 10 wt % PEG 4000 of the yellow ink was replaced by 10 wt % polyvinyl pyrrolidone having an average molecular weight of about 10,000 and (2) the 7 wt % 1,5-pentanediol of the yellow ink was increased to 10 wt % 1,5-pentanediol. The degree of bleed control achieved between the yellow and cyan inks respectively containing PVP 10000 and Ficoll® 70,000, albeit not as good as that achieved in Example 19, is substantially less than the bleed between magenta and yellow inks in which the yellow ink contained no polymeric components.

Example 21

The following yellow inks were formulated and printed against the pigment-based black ink employed in Hewlett-Packard's DeskJet® 850 printer:

TABLE 17

Ink-Jet Ink Compositions of Example 21.
(All percentages are in weight percent of total ink composition.)

| Component | Yellow Ink with Polymer | Yellow Ink w/o Polymer |
|---|---|---|
| Dye | TMA AY23 (0.09 abs) | TMA AY23 (0.09 abs) |
| 1,5-pentanediol | 10 wt % | 7 wt % |
| 2-pyrrolidone | 5 wt % | 5 wt % |
| polymer | 10 wt % PVP 10000 | — |
| water | balance | balance |

There was substantially less bleed when the black pigment-based ink was paired with the yellow ink containing PVP 10000 compared to pairing the same black ink with the yellow ink containing no polymeric additive.

Example 22

The following cyan inks were formulated and printed against the pigment-based black ink employed in Hewlett-Packard's DeskJet® 850 printer:

TABLE 18

Ink-Jet Ink Compositions of Example 22.
(All percentages are in weight percent of total ink composition.)

| Component | Cyan Ink with Polymer | Cyan Ink w/o Polymer |
|---|---|---|
| Dye | • TMA DB199 (0.0675 abs) • Na AB9 (0.12 abs) | • TMA DB199 (0.0675 abs) • Na AB9 (0.12 abs) |
| 1,5-pentanediol | 7 wt % | 7 wt % |
| 2-pyrrolidone | 5 wt % | 5 wt % |
| polymer | 10 wt % LEG | — |
| water | balance | balance |

There was substantially less bleed when the black pigment-based ink was paired with the cyan ink containing LEG compared to pairing the same black ink with the cyan ink containing no polymeric additive.

Example 23

The following pigment-based magenta ink was formulated and printed against the pigment-based black ink employed in Hewlett-Packard's DeskJet® 850 printer:

TABLE 19

Ink-Jet Ink Compositions of Example 23.
(All percentages are in weight percent of total ink composition.)

| Component | Magenta Ink |
|---|---|
| Pigment | 2 wt % Hostafine Magenta Pigment[1] |
| 1,5-pentanediol | 3 wt % |
| 2-pyrrolidone | 7 wt % |
| polymer | 8 wt % polyethylene glycol 4,000 |
| water | balance |

[1] Commercially available from Hoescht Celanese.

The magenta and black pigment-based inks of Example 23 were printed onto Gilbert Bond paper. There was good bleed control between these two inks, again evidencing the occurrence of aqueous phase separation.

Thus, it has been demonstrated that the induction of aqueous phase separation between two adjacently-printed ink-jet inks in accordance with the invention achieves substantial bleed control.

Industrial Applicability

The present method disclosed herein for controlling bleed between adjacently-primed inks, as well as the disclosed ink-jet ink set, are expected to find commercial use in ink-jet color printers, particularly thermal ink-jet printers.

Thus, there has been disclosed herein a method and ink-jet ink set which achieve bleed control by exploiting the phenomena of aqueous phase separation. It will be readily apparent to those skilled in the art that various changes and modifications of an obvious nature may be made without departing from the spirit of the invention, and all such changes and modifications are considered to fall within the scope of the invention as defined by the appended claims.

What is claimed is:

1. An ink-jet ink set for ink-jet priming including a first ink-jet ink comprising a first colorant and a first aqueous vehicle and a second ink-jet ink comprising a second colorant and a second aqueous vehicle, said first aqueous vehicle including a first polymer and said second aqueous vehicle including a second species capable of inducing aqueous phase separation of said first and second aqueous vehicles in the event of contact therebetween, said first and second ink-jet inks having sufficiently low viscosities such that said first and second ink-jet inks are capable of being readily jetted from an ink-jet pen.

2. The ink-jet ink set of claim 1 wherein said first polymer has a molecular weight within the range of about 300 to 20,000.

3. The ink-jet ink set of claim 2 wherein said first polymer has a molecular weight within the range of about 1,000 to 5,000.

4. The ink-jet ink set of claim 1 wherein said first polymer is selected from the group consisting of polyethylene glycols having an average molecular weight of at least about 200; polypropylene glycols having an average molecular weight of at least about 200; polysaccharides; polysucrose having an average molecular weight within the range of about 40,000 to 400,000; ethoxylated glycerols having an average molecular weight within the range of about 500 to 10,000; propoxylated glycerols having an average molecular weight within the range of about 500 to 10,000; polyvinylalcohols having an average molecular weight within the range of about 10,000 to 200,000; polyvinylpyrrolidones having an average molecular weight within the range of about 2,000 to 500,000; polysaccharide salts; polyacrylamides having an average molecular weight within the range of about 1,000 to 1,000,000; polyacrylic acids having an average molecular weight within the range of about 1,000 to 500,000; polyethylenimines having an average molecular weight within the range of about 1,000 to 50,000; and derivatives thereof.

5. The ink-jet ink set of claim 1 wherein said second species is selected from the group consisting of a second polymer and a low-molecular weight component, wherein said second polymer is not identical to said first polymer.

6. The ink-jet ink set of claim 5 wherein said second polymer is selected from the group consisting of polyethylene glycols having an average molecular weight of at least about 200; polypropylene glycols having an average molecular weight of at least about 200; polysaccharides; polysucrose having an average molecular weight within the range of about 40,000 to 400,000; ethoxylated glycerols having an average molecular weight within the range of about 500 to 10,000; propoxylated glycerols having an average molecular weight within the range of about 500 to 10,000; polyvinylalcohols having an average molecular weight within the range of about 10,000 to 200,000; polyvinylpyrrolidones having an average molecular weight within the range of about 2,000 to 500,000; polysaccharide salts; polyacrylamides having an average molecular weight within the range of about 1,000 to 1,000,000; polyacrylic acids having an average molecular weight within the range of about 1,000 to 500,000; polyethylenimines having an average molecular weight within the range of about 1,000 to 50,000; and derivatives thereof.

7. The ink-jet ink set of claim 5 wherein said low-molecular weight component is selected from the group consisting of phosphate salts, sulfate salts, propyl alcohol, glycerol, ethylene glycol monobutyl ether, glucose, glycol, and sodium chloride.

8. The ink-jet ink set of claim 7 wherein said low-molecular weight component is selected from the group consisting of potassium phosphate and glycol.

9. The ink-jet ink set of claim 1 wherein said first polymer and said second species are each nonionic polymers.

10. The ink-jet ink set of claim 9 wherein said first polymer is polyethylene glycol and said second species is selected from the group consisting of ethoxylated glycerol, polyethylene glycol, polyvinyl pyrrolidone, and dextran, said dextran having an average molecular weight within the range of about 11,000 to 19,000.

11. The ink-jet ink set of claim 10 wherein said polyethylene glycol has an average molecular weight within the range of about 1,500 to 5,000.

12. The ink-jet ink set of claim 1 wherein said first ink-jet ink comprises (a) about 2 to 3 wt % dye; (b) about 5 to 15 wt % 1,5-pentanediol; (c) about 5 to 15 wt % 2-pyrrolidone; (d) about 5 to 25 wt % of said first polymer; and (e) water, and wherein said second ink-jet ink comprises (a) about 2 to 3 wt % dye; (b) about 7 to 15 wt % 1,5-pentanediol; (c) about 5 to 15 wt % 2-pyrrolidone; (d) about 5 to 25 wt % of said second species; and (e) water.

13. The ink-jet ink set of claim 1 wherein said first ink and said second ink each have a viscosity within the range of about 2 to 15 cP.

14. The ink-jet ink set of claim 1 wherein said first ink-jet ink is a yellow ink-jet ink, wherein said second ink-jet ink is a cyan ink-jet ink, wherein said ink-jet ink set further includes a third magenta ink-jet ink and a fourth black ink-jet ink, wherein said third magenta ink-jet ink and said fourth black ink-jet ink respectively contain a third species and a fourth species such that aqueous phase separation is induced in the event of contact between any ink in said ink-jet ink set.

15. The ink-jet ink set of claim 14 wherein said first polymer is polyethylene glycol having an average molecular weight of about 4000, wherein said second species comprises polyethylene glycol having an average molecular weight of about 7500 and polyethylene glycol having an average molecular weight of about 4000, and wherein said third species is polyethylene glycol methyl ether 2000.

16. A method of reducing bleed in printing at least two different color inks onto a print medium from an ink-jet pen, said method comprising the steps of:

(a) printing a first ink-jet ink comprising a first colorant and a first aqueous vehicle, said first aqueous vehicle including a first polymer; and (b) printing a second ink-jet ink comprising a second colorant and a second aqueous vehicle, said second aqueous vehicle including a second species capable of inducing aqueous phase separation of said first and second aqueous vehicles in the event of contact therebetween, said first and second ink-jet inks having sufficiently low viscosities such that said first and second ink-jet inks are capable of being readily jetted from an ink-jet pen, whereby bleed between said first ink and said second ink is reduced when said second ink is printed adjacent said first ink-jet ink.

17. The method of claim 16 wherein said first polymer has a molecular weight within the range of about 300 to 20,000.

18. The method of claim 17 wherein said first polymer has a molecular weight within the range of about 1,000 to 5,000.

19. The method of claim 16 wherein said first polymer is selected from the group consisting of polyethylene glycols having an average molecular weight of at least about 200; polypropylene glycols having an average molecular weight of at least about 200; polysaccharides; polysucrose having an average molecular weight within the range of about 40,000 to 400,000; ethoxylated glycerols having an average molecular weight within the range of about 500 to 10,000; propoxylated glycerols having an average molecular weight within the range of about 500 to 10,000; polyvinylalcohols having an average molecular weight within the range of about 10,000 to 200,000; polyvinylpyrrolidones having an average molecular weight within the range of about 2,000 to 500,000; polysaccharide salts; polyacrylamides having an average molecular weight within the range of about 1,000 to 1,000,000; polyacrylic acids having an average molecular weight within the range of about 1,000 to 500,000; polyethylenimines having an average molecular weight within the range of about 1,000 to 50,000; and derivatives thereof.

20. The method of claim 16 wherein said second species is selected from the group consisting of a second polymer and a low-molecular weight component.

21. The method of claim 20 wherein said second polymer is selected from the group consisting of polyethylene glycols having an average molecular weight of at least about 200; polypropylene glycols having an average molecular weight of at least about 200; polysaccharides; polysucrose having an average molecular weight within the range of about 40,000 to 400,000; ethoxylated glycerols having an average molecular weight within the range of about 500 to 10,000; propoxylated glycerols having an average molecular weight within the range of about 500 to 10,000; polyvinylalcohols having an average molecular weight within the range of about 10,000 to 200,000; polyvinylpyrrolidones having an average molecular weight within the range of about 2,000 to 500,000; polysaccharide salts; polyacrylamides having an average molecular weight within the range of about 1,000 to 1,000,000; polyacrylic acids having an average molecular weight within the range of about 1,000 to 500,000; polyethylenimines having an average molecular weight within the range of about 1,000 to 50,000; and derivatives thereof.

22. The method of claim 20 wherein said low-molecular weight component is selected from the group consisting of phosphate salts, sulfate salts, propyl alcohol, glycerol, ethylene glycol monobutyl ether, glucose, glycol, and sodium chloride.

23. The method of claim 22 wherein said low-molecular weight component is selected from the group consisting of potassium phosphate and glycol.

24. The method of claim 16 wherein said first polymer and said second species are each nonionic polymers.

25. The method of claim 24 wherein said first polymer is polyethylene glycol and said second species is selected from the group consisting of ethoxylated glycerol, polyethylene glycol, polyvinyl pyrrolidone, and dextran, said dextran having an average molecular weight within the range of about 11,000 to 19,000.

26. The method of claim 25 wherein said polyethylene glycol has an average molecular weight within the range of about 1,500 to 5,000.

27. The method of claim 16 wherein said first ink-jet ink comprises (a) about 2 to 3 wt % dye; (b) about 7 to 15 wt % 1,5-pentanediol; (c) about 5 to 15 wt % 2-pyrrolidone; (d) about 5 to 25 wt % of said first polymer; and (e) water, and wherein said second ink-jet ink comprises (a) about 2 to 3 wt % dye; (b) about 7 to 15 wt % 1,5-pentanediol; (c) about 5 to 15 wt % 2-pyrrolidone; (d) about 5 to 25 wt % of said second species; and (e) water.

28. The method of claim 16 wherein said first ink and said second ink have a viscosity within the range of about 2 to 15 cP.

29. The method of claim 16 wherein said first ink-jet ink is a yellow ink-jet ink, wherein said second ink-jet ink is a cyan ink-jet ink, wherein said method further comprises printing a third magenta ink-jet ink and a fourth black ink-jet ink, wherein said third magenta ink-jet ink and said fourth black ink-jet ink respectively contain a third species and a fourth species such that aqueous phase separation is induced in the event of contact between any of said first, second, third and fourth ink-jet inks.

30. The method of claim 29 wherein said first polymer is polyethylene glycol having an average molecular weight of about 4000, wherein said second species comprises polyethylene glycol having an average molecular weight of about 7500 and polyethylene glycol having an average molecular weight of about 4000, and wherein said third species is polyethylene glycol methyl ether 2000.

* * * * *

UNITED STATES PATENT AND TRADEMARK OFFICE
CERTIFICATE OF CORRECTION

PATENT NO.    : 5,700,317
DATED         : December 23, 1997
INVENTOR(S)   : Raymond J. Adamic It is certified that error appears in the above-identified patent and that said Letters Patent is hereby corrected as shown below:

Column 27,
Line 12, "priming" to -- printing --.

Signed and Sealed this

Sixth Day of May, 2003

JAMES E. ROGAN
*Director of the United States Patent and Trademark Office*